Figure 15:
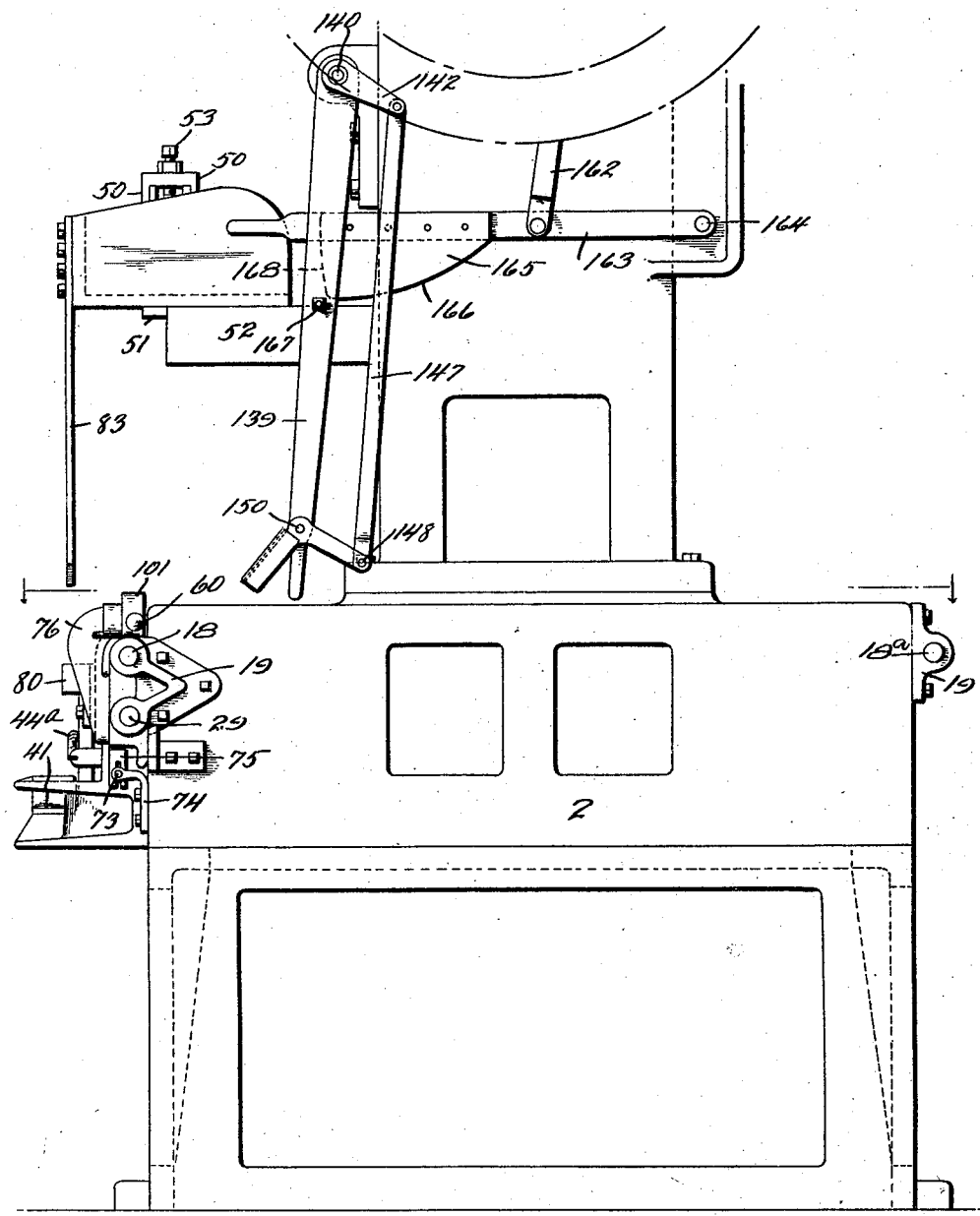

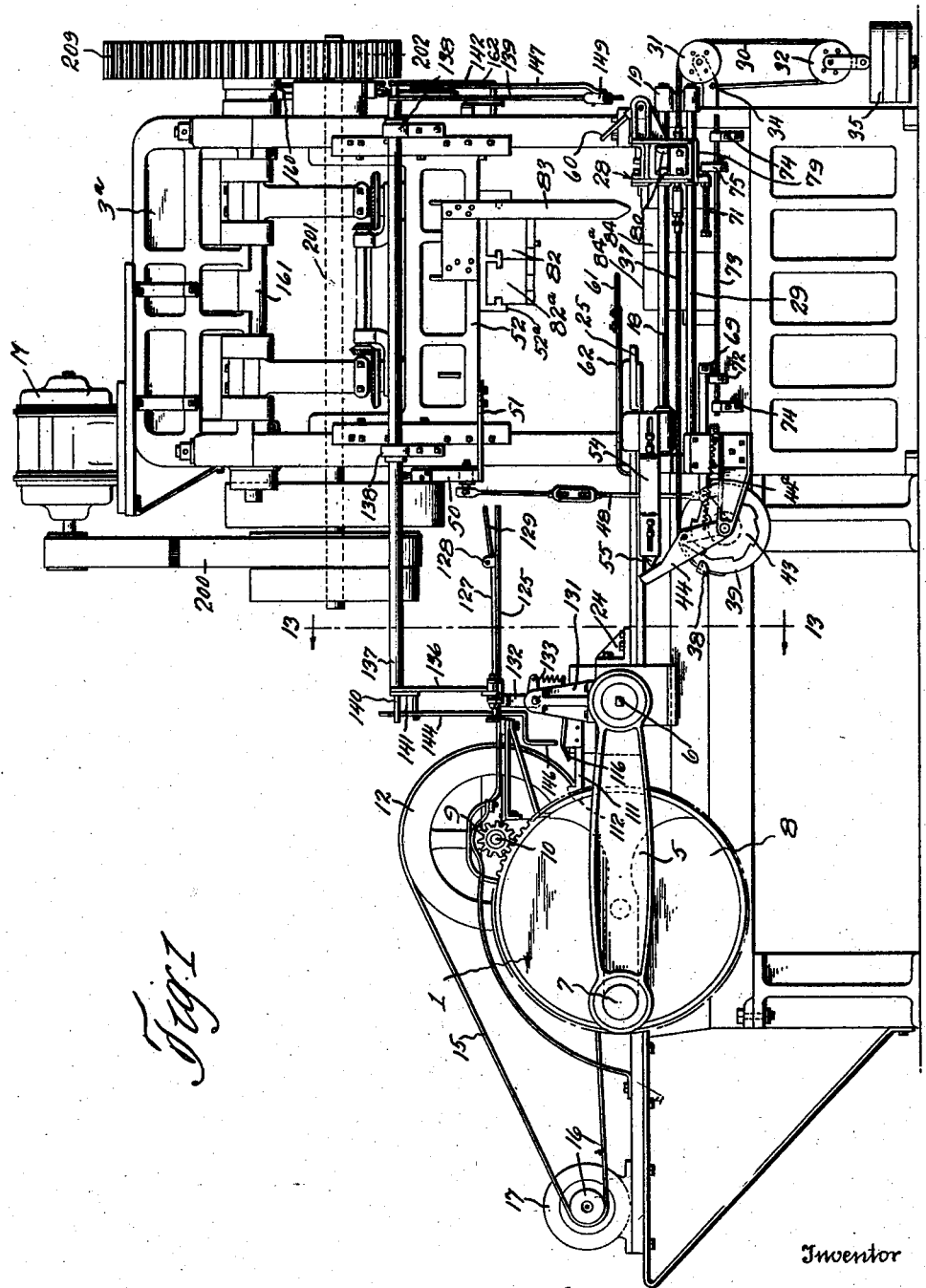

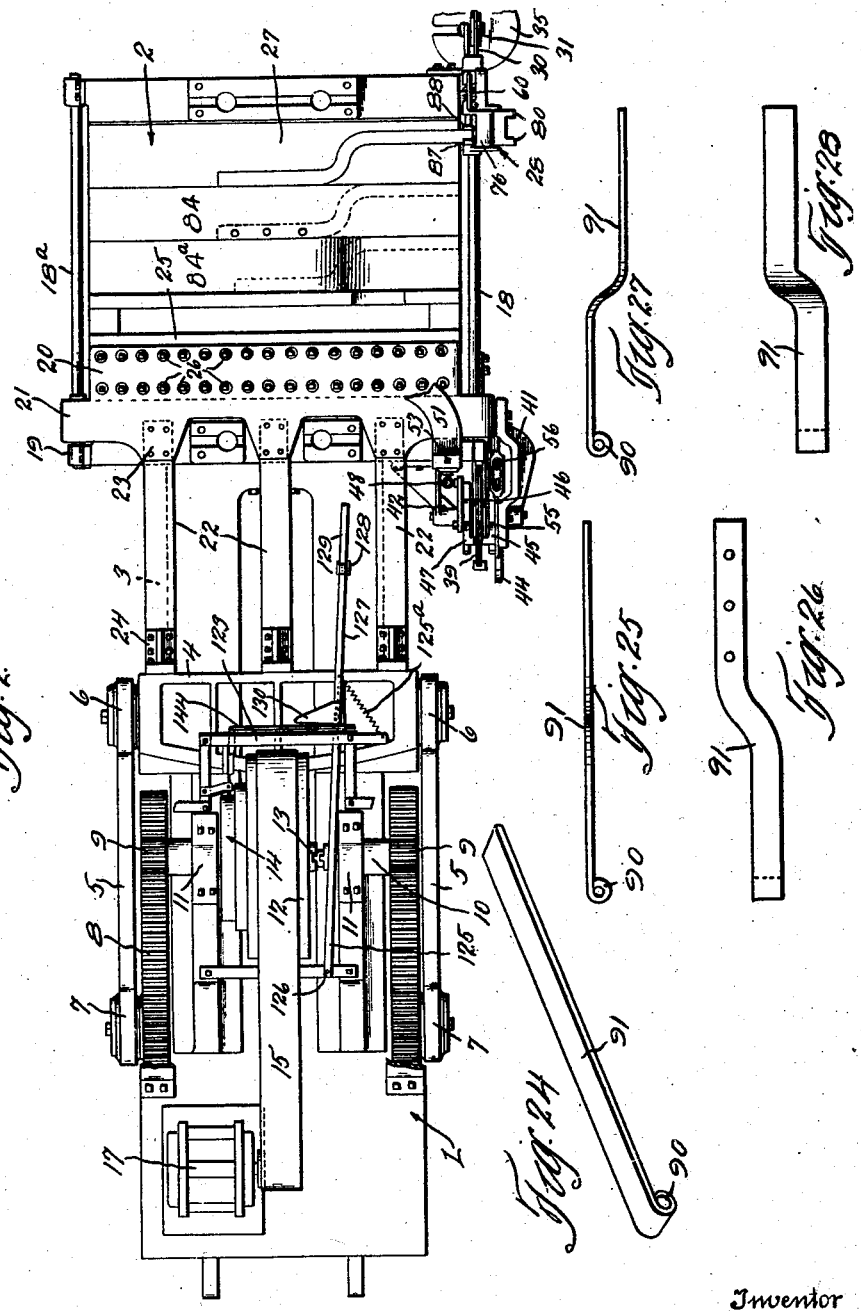

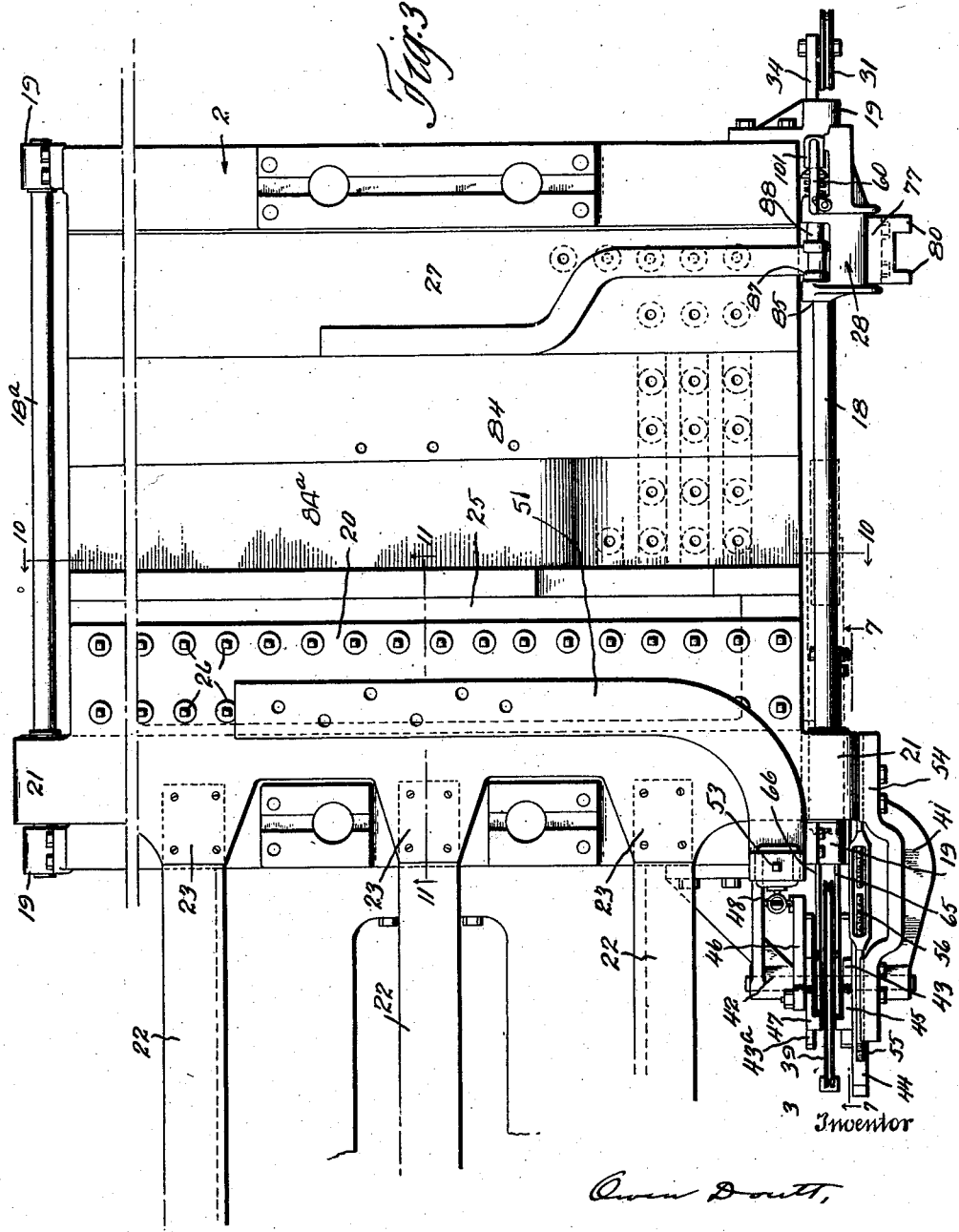

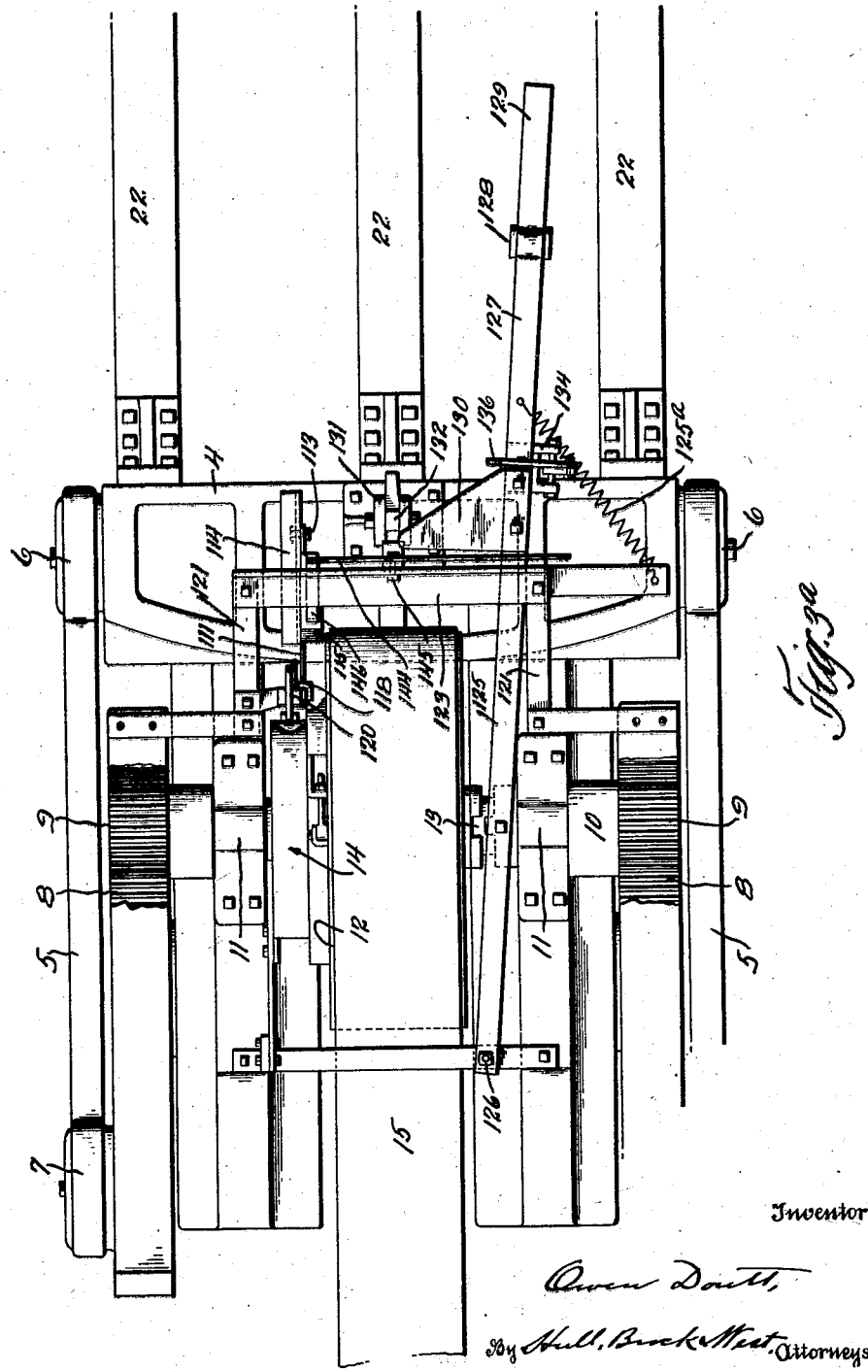

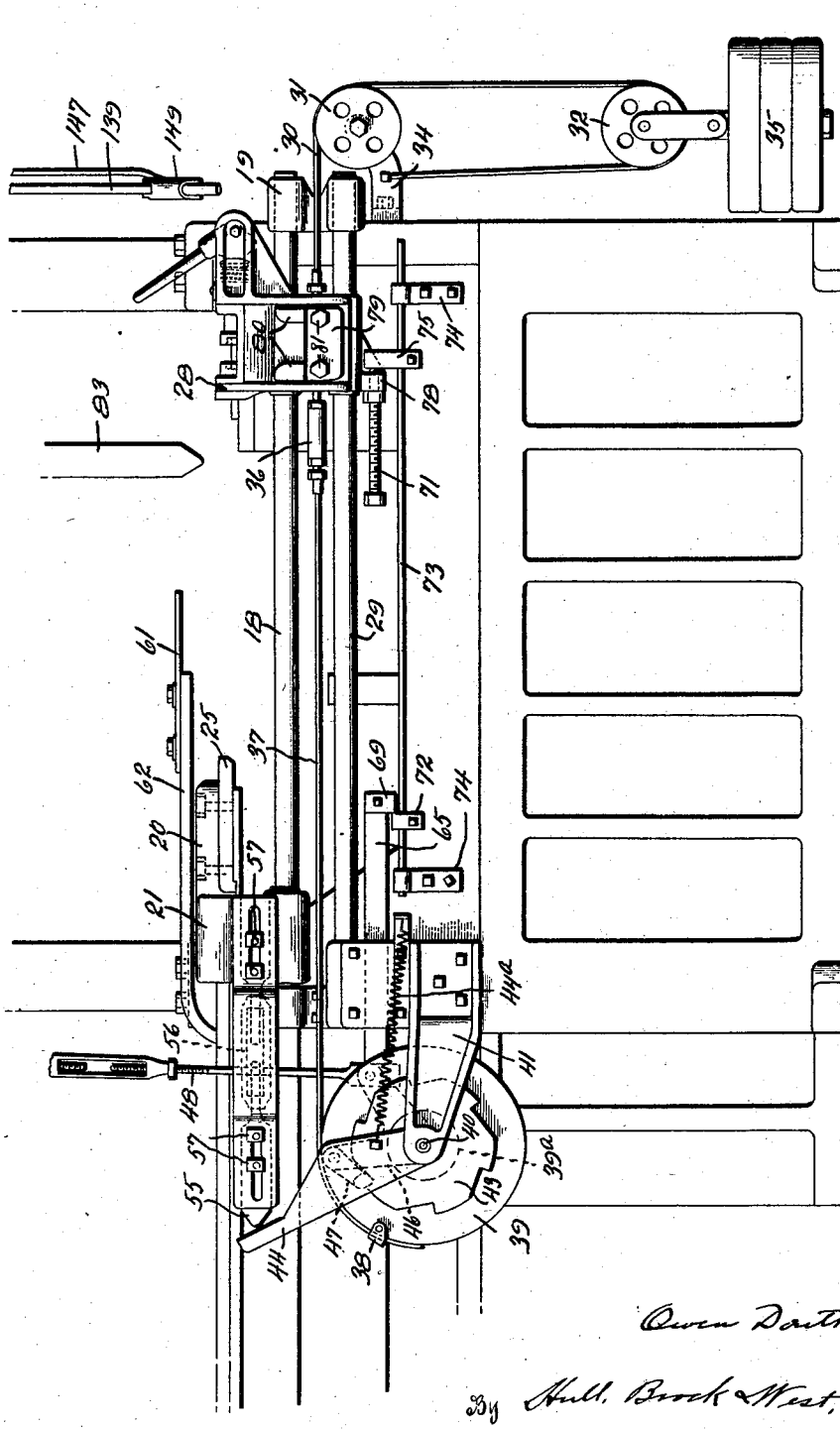

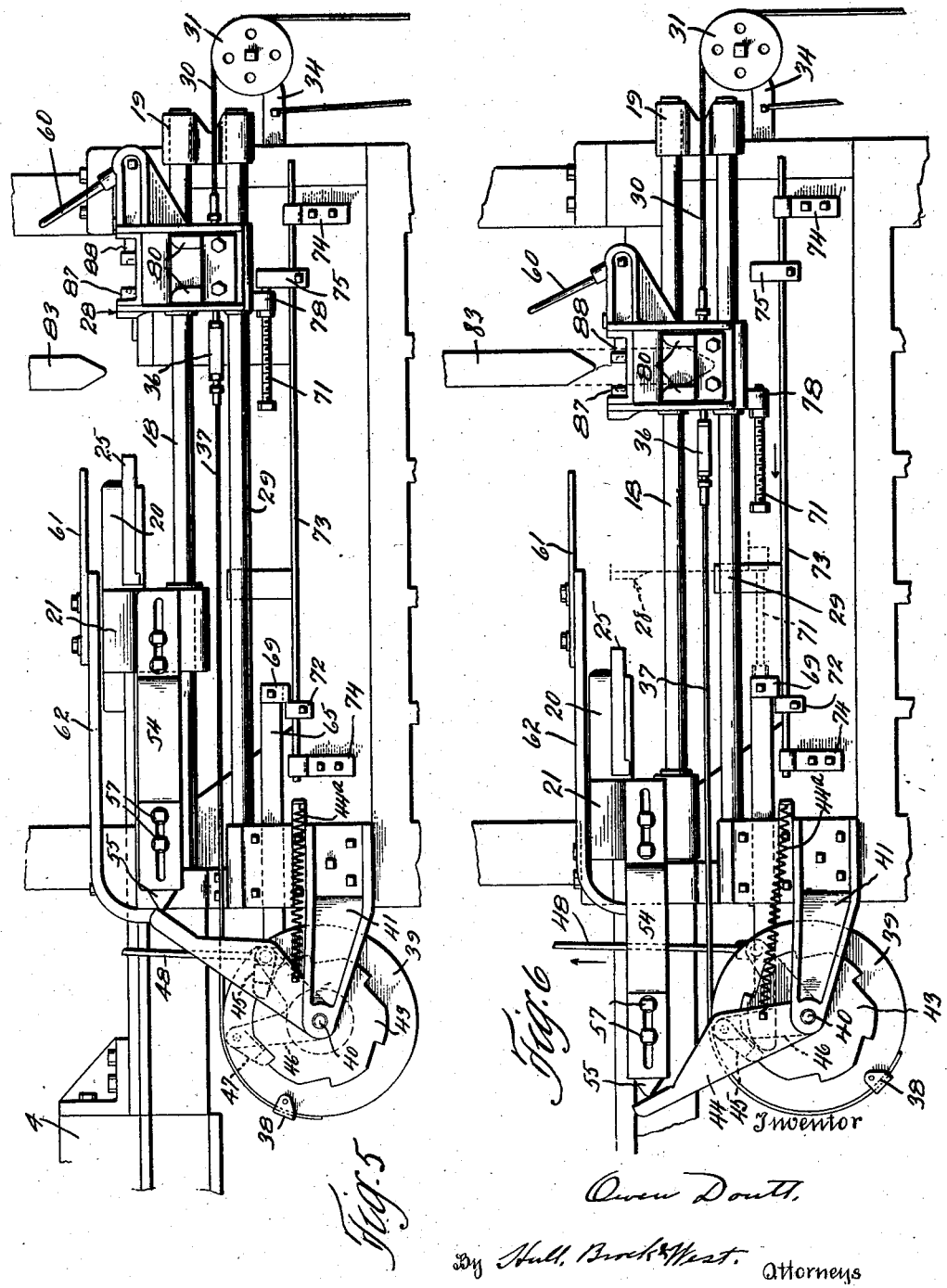

June 24, 1930. O. DOUTT 1,765,790
BENDING MACHINE
Filed July 27, 1925 12 Sheets-Sheet 7
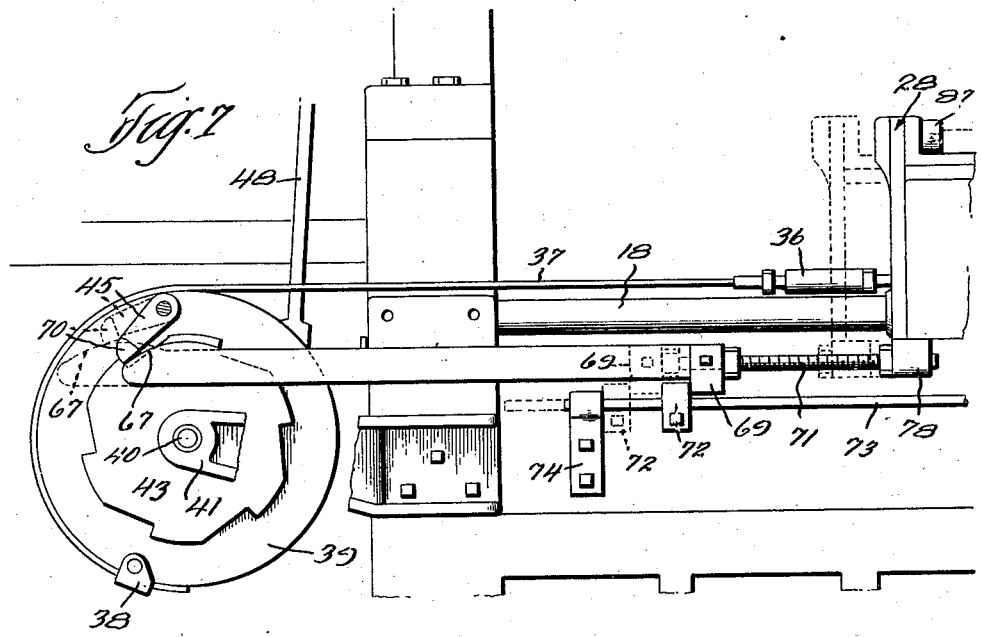
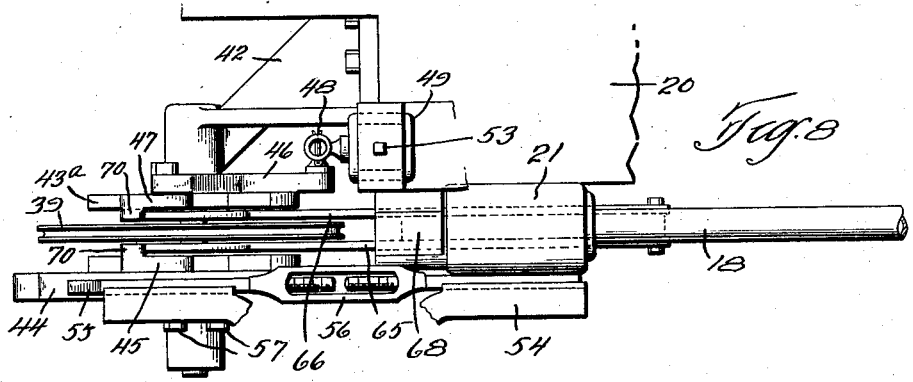
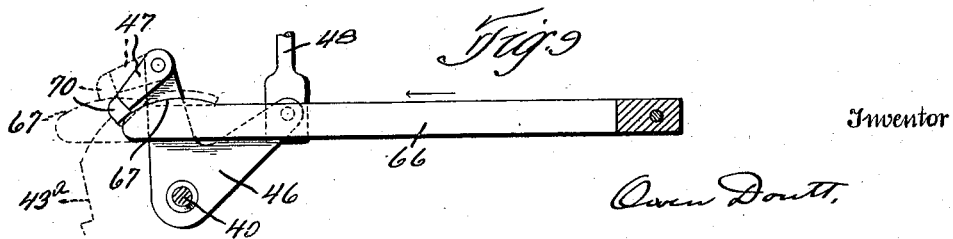
Inventor
Owen Doutt,
By Hull, Brock & West, Attorneys

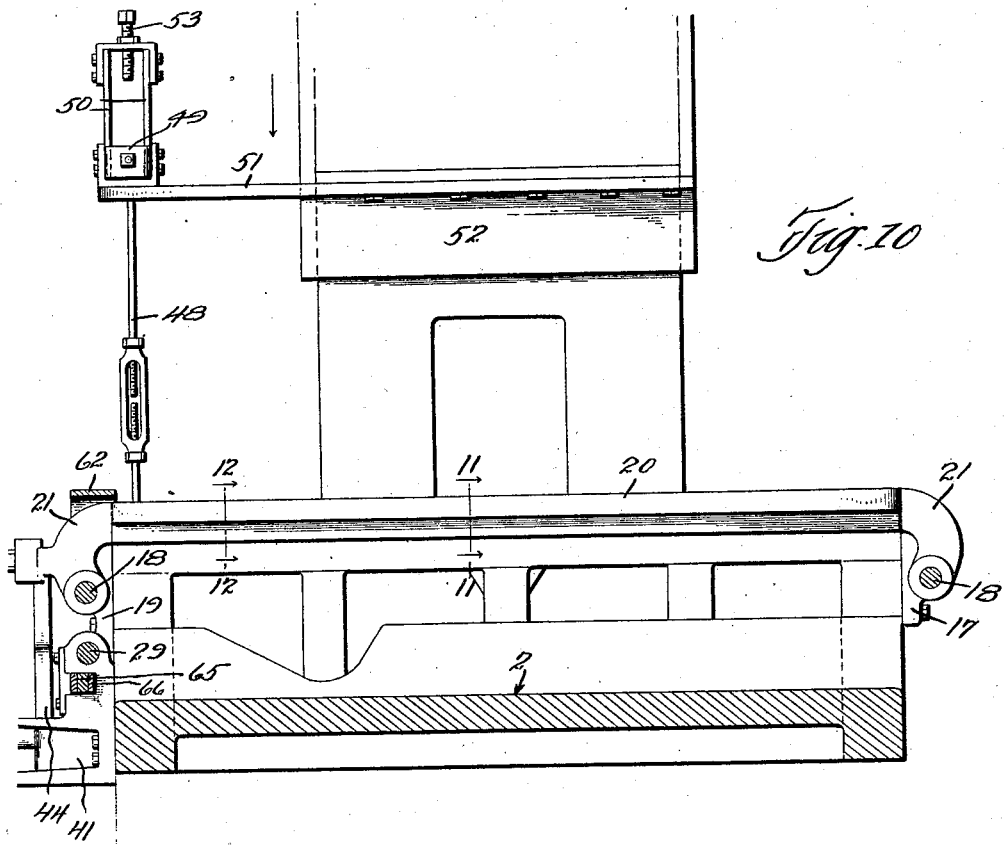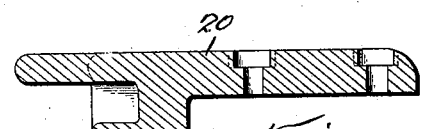

June 24, 1930.  O. DOUTT  1,765,790
BENDING MACHINE
Filed July 27, 1925   12 Sheets-Sheet 9
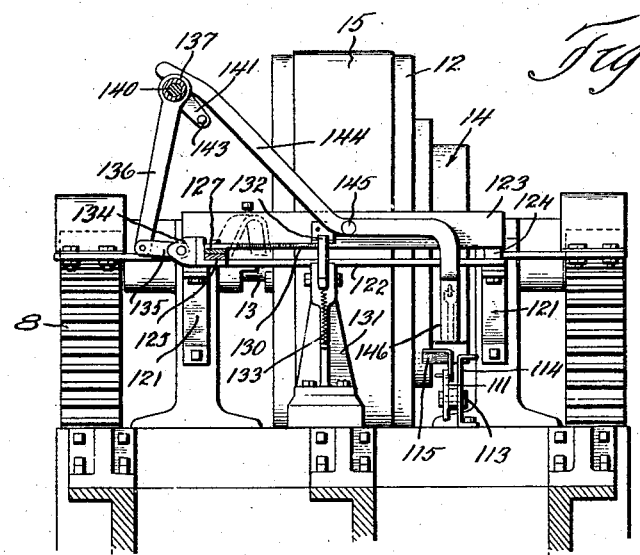
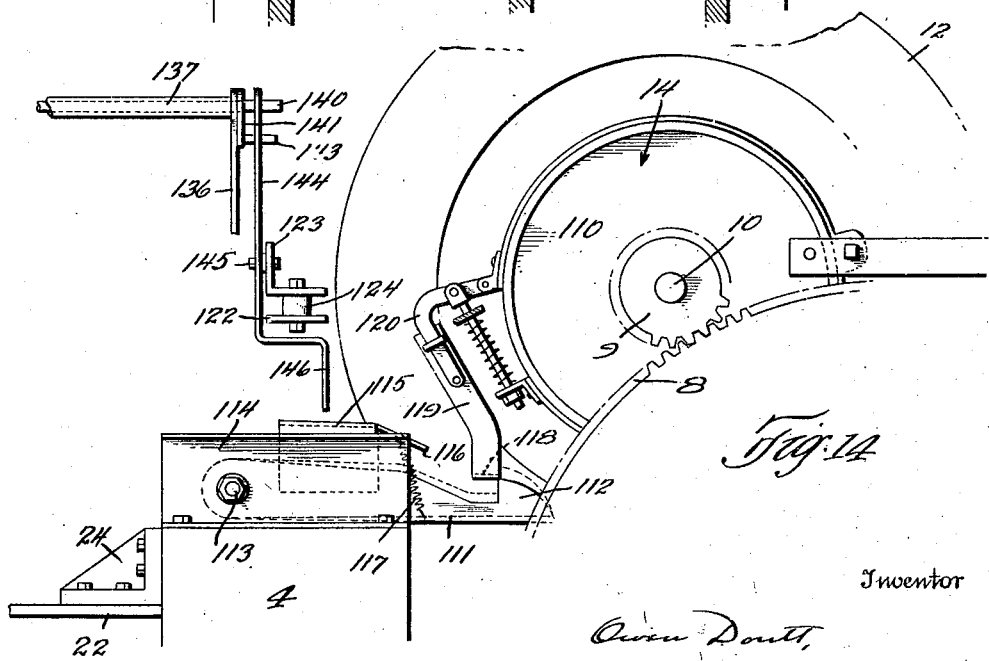
Inventor
Owen Doutt,
By Hull, Brock & West, Attorneys June 24, 1930.                    O. DOUTT                    1,765,790
                              BENDING MACHINE
                          Filed July 27, 1925        12 Sheets-Sheet 11

Inventor
Owen Doutt,
By Hull, Buck & West, Attorneys

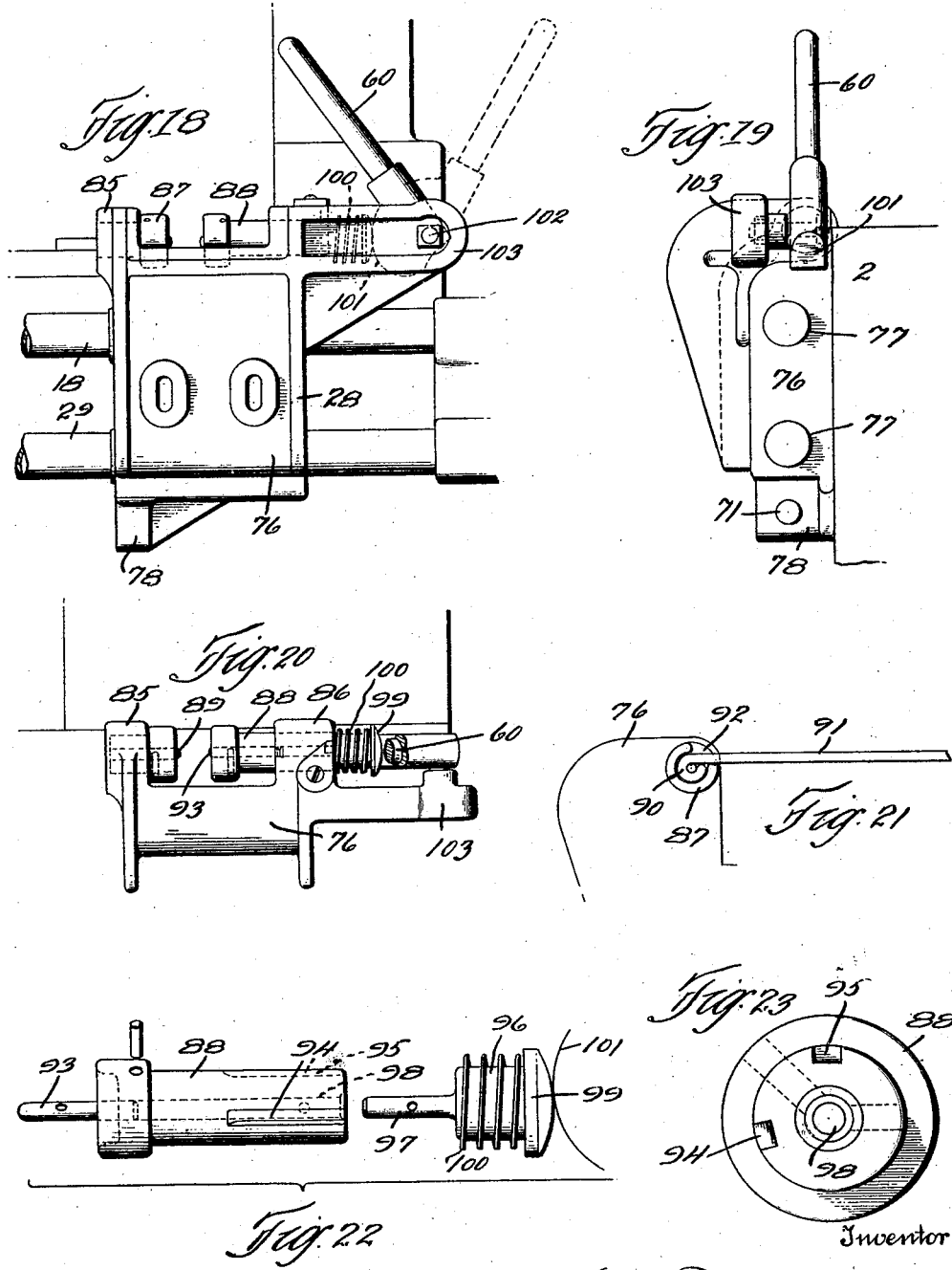

Patented June 24, 1930

1,765,790

UNITED STATES PATENT OFFICE

OWEN DOUTT, OF DETROIT, MICHIGAN, ASSIGNOR, BY MESNE ASSIGNMENTS, TO GENERAL SPRING BUMPER CORPORATION, A CORPORATION OF MICHIGAN

BENDING MACHINE

Application filed July 27, 1925. Serial No. 46,264.

This machine is a device for giving first a horizontal bend and then one or more vertical bends to flat stock and is particularly adapted for forming bumper arms.

It consists generally of a reciprocating bender or bulldozer and a press or vertical bender mounted upon a common base; the bulldozer giving first the horizontal bend to the stock and upon its return moving the stock into position for the press or vertical bender to give the first vertical bend. The return of the press or vertical bender then automatically moves the stock rearwardly into position for the next operation of the press and so on until all the punch press operations have been completed and the last upward movement of the press plunger then automatically releases the stock from its carrier or holder allowing it to be dropped into an oil bath.

The machine is designed to handle work which requires only one bend, or operation, in a horizontal plane, and one or more operations in a vertical plane.

Only one die can be carried by the bulldozer and a complementary die is fastened to the forward end of the bed. The press, however, may carry one or more dies and complementary dies are fastened, beneath them, to the bed of the machine. The bulldozer operates on the work first and returns to normal position and then the press is operated the desired number of times, the work being automatically moved from one die to the next.

Each operation of either the bulldozer or vertical press is controlled by separate manually operated clutches, which are so constructed that they will automatically release after one operation, and their control handles are so related that both clutches can not be thrown in at the same time.

The principal novel features of construction consist in first the general combination of the bulldozer and press; second, the mechanism for holding and moving the work forward into position for each succeeding operation and then releasing it at a predetermined time; third, a brake mechanism for stopping the bulldozer at the end of its return stroke thus preventing the inertia of the parts from starting it on another forward stroke; and fourth, a safety control which prevents the press clutch from being operated when the bulldozer is not in its normal position, and vice versa.

Figure 16:
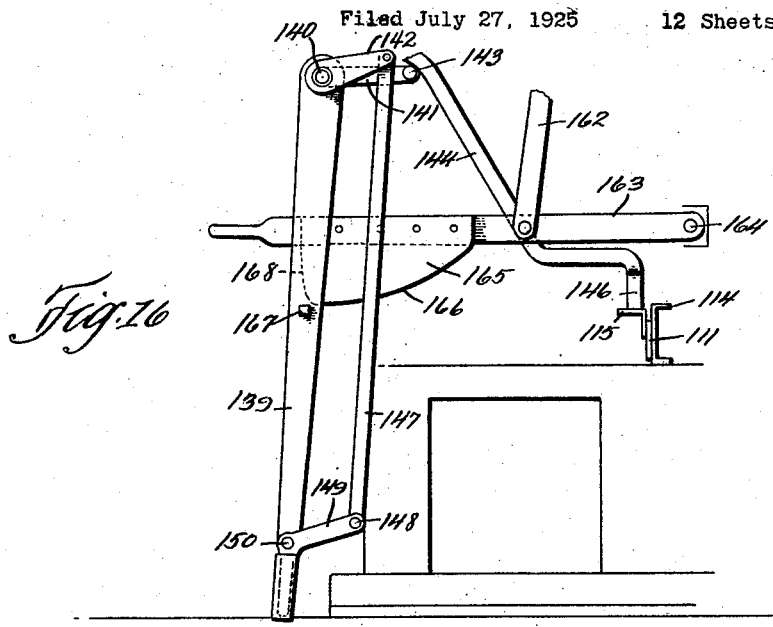
Figure 17:
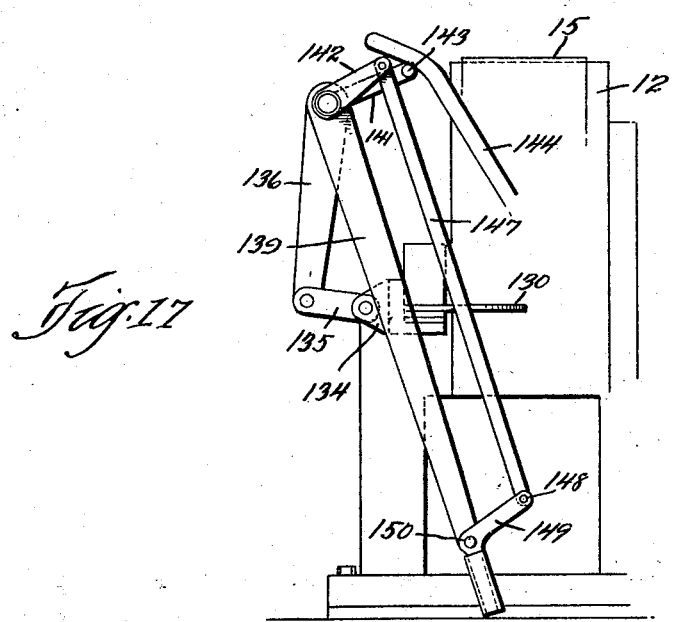

In the drawings Fig. 1 is a side elevation of the machine; Fig. 2 is a plan view with the press removed; Fig. 3 is an enlarged plan view of the forward part of the machine, the press being removed, showing the mechanism for holding and moving the work forward; Fig. 3ª is an enlarged plan view of the rear part of the machine; Fig. 4 is an enlarged side elevation of the parts shown in Fig. 3, the cross head of the bulldozer being in starting position; Fig. 5 is a view similar to Fig. 4 showing the parts in the position they assume after the cross head has moved forwardly, given the stock the horizontal bend and has returned to a position where it is just starting to operate the mechanism for moving the stock to the next position; Fig. 6 is a view similar to Fig. 5 showing the bulldozer cross head at the end of its rearward stroke and the work holder moved into position for the vertical press operation; Fig. 7 is an enlarged sectional view taken on the line 7—7 of Fig. 3; Fig. 8 is a plan view of Fig. 7, and Fig. 9 is a diagrammatic view showing the operation of the release mechanism which allows the work holder to be returned to the starting position after the work has been released therefrom; Fig. 10 is a section on the line 10—10 of Fig. 3; Fig. 11 is an enlarged section on the line 11—11 of Figs. 3 and 10; Fig. 12 is an enlarged section on the line 12—12 of Fig. 10; Fig. 13 is a section on the line 13—13 of Fig. 1 showing the brake release and clutch operating mechanisms; Fig. 14 is a side elevation of the brake mechanism and the releasing mechanism therefor looking from the right of Fig. 13; Fig. 15 is an enlarged elevation of the front end of the machine showing particularly the operating controls; Fig. 16 is an enlarged elevation of the operating controls showing also the connecting parts; Fig. 17 is a view similar to Fig. 16 showing the operating controls after they have been moved to release the bulldozer brake and throw in the bulldozer clutch; Fig. 18 is an enlarged side elevation of the work holder; Fig. 19 is an end elevation looking from the right of Fig. 18; Fig. 20 is a plan view of Fig. 18; Fig. 21 is a detail view showing the manner in which the stock is held in the work holder; Fig. 22 is an enlarged side elevation of the movable parts of the work holder, said parts being in separated position; Fig. 23 is an enlarged elevation looking from the right of the part 88 shown in Fig. 22; Fig. 24 is a perspective view of the stock as it is delivered to the machine to be bent; Fig. 25 is an edge view and Fig. 26 a plan view of the stock after the horizontal or bulldozer bending operation and the punching operation; and Figs. 27 and 28 are similar views after the vertical press operation.

The bulldozer generally indicated at 1 is mounted upon the rear end of a bed 2 and a vertical bender press 3$^a$ of generally well known design is mounted upon the forward end of the bed 2. The bed has cross head guides 3 upon which a cross head 4 is adapted to be moved back and forth by pitmen 5 which have their forward ends pivotally connected to the ends of the cross head 4 at 6 and their rear ends pivotally connected at 7 to large gears 8 which are operated by gears 9 on a shaft 10. The shaft 10 is mounted in bearings 11 and has mounted upon it between the bearings 11 a pulley 12, clutch mechanism 13 and brake mechanism 14. The shaft 10 is rotated by a belt 15 passing around the pulley 12 and a pulley 16 on the armature shaft of a motor 17.

The forward portion of the bed 2 has guide rods 18 and 18$^a$ carried in brackets 19 mounted on each side thereof. A die carrying member 20 has downwardly projecting arms 21 on each side thereof and is adapted to be moved back and forth on the guides 18 by the operation of the bulldozer, the die carrying member 20 being connected to the cross head 4 of the bulldozer by arms 22 which are fastened to rearwardly extending extensions 23 of the die carrier and to the front of the cross head 4 by brackets 24.

A die 25 is fastened by bolts 26 to the under face of the forward end of the die carrier 20.

A die 27 complementary to the die 25 and in line therewith is fastened to the forward end of the base 2. The work is held at one end in a work holder generally designated at 28 and the rest lies flat on the bed 2 in front of the die 27. As the die holder 20 and die 25 are moved forwardly through the action of the bulldozer the work is caught between the dies 25 and 27 and bent to the desired form in a horizontal plane. The work holder 28, which will be described in detail later, is adapted to be moved back and forth upon a bar 29 and the bar 18 on the front of the machine, the bar 29 being mounted directly below the bar 18 and carried by the bracket 19. Attached to the right hand side of the carrier 28 is one end of a cable 30 which passes over a sheave 31 carried by an arm 34 on the end of the base 2 and downwardly and around a sheave 32 and thence up and has its other end fastened at 33 to the arm 34. The sheave 32 has suspended therefrom a weight 35. As will be seen, this weight 35 and cable 30 tend to bring the work carrier 28 to the right hand end of the machine, in other words, to an initial position. Adjustably connected at 36 to the opposite side of the carrier 28 is one end of a cable 37, the other end being fastened at 38 to a pulley 39. The pulley 39 is keyed to a shaft 40 carried in brackets 41 and 42 extending out from the base 2. Keyed to the shaft 40 on each side of the pulley 39 and spaced therefrom by spacers 39$^a$ are ratchet wheels 43 and 43$^a$. An arm 44 is rotatably mounted on the shaft 40, beside the ratchet wheel 43 and carries a dog 45 which is adapted to engage the teeth of the ratchet wheel 43. Rotatably mounted on the shaft 40 and on the opposite side of the pulley 39 adjacent the ratchet 43$^a$ is a bell crank 46 which has a dog 47 connected to one arm thereof, this dog 47 being adapted to engage the teeth of the ratchet wheel 43$^a$. Pivotally connected to the other arm of the bell crank 46 is one end of a rod 48 which has its other end connected to a block 49 (Fig. 10) slidably mounted in guides 50 extending upwardly from an arm 51 which projects outwardly from the cross head 52 of the vertical press 3$^a$. This construction will allow the press plunger a certain amount of up and down movement before it operates the rod 48. This movement can be varied by an adjusting screw 53.

Adjustably connected to one arm 21 of the die holder 20 is an arm 54 which in turn carries an arm 55 the length of which can be adjusted by a turnbuckle 56 and locked in the desired position by bolts 57. The arm 55 is positioned in line with the arm 44 and on the return movement of the bulldozer the arm 55 will strike the arm 44 as shown in Fig. 5 and as the dog 45 is in engagement with the ratchet wheel 43, the pulley 39 will be rotated and the work holder 28 and the work carried thereby will be moved to the next position ready for the first operation of the vertical press as shown in Fig. 6. The work holder 28 will be held in the different positions by means of the arms 55 and 44 and the dog 45.

As the press cross head 52 comes down, the block 49 will be engaged by the screw 53 and the rod 48 will be moved downwardly which in turn will rotate the crank 46 about the shaft 40 and move the pawl 47 back into engagement with the next tooth behind the one previously engaged. Then on the return movement of the cross head 52 the rod 48 will be moved upwardly and the bell crank 46 and dog 47 will be moved in the opposite direction which in turn will rotate the shaft 40 and pulley 39, thus moving the work holder to the next position. As the shaft 40 is rotated, the ratchet wheel 43 keyed thereto will be rotated, and the dog 45 will engage the next tooth of the ratchet 43 and hold the work holder at the next position acting as a detent so that the operation of the vertical press can be repeated as many times as there are operations necessary. When the bulldozer moves the die holder 20 forwardly and consequently the arm 55, the arm 44 is forced to follow by means of a spring 44$^a$. After the last operation of the press the return movement of the cross head 52 causes the work holder 28 to move rearwardly another space in the manner just described, which brings the clamping arm 60, of the work holder, into engagement with an arm 61 adjustably fastened to an arm 62 fastened to the base of the machine. The arm 61 throws the clamping arm 60 to the right which releases the work held in the work holder. The rearward movement of the work holder 28, after the last vertical press operation, also operates a mechanism which throws both the dogs 45 and 47 out of engagement with their respective ratchet wheels which allows the weight 35 to return the work holder to the starting position. The above mentioned mechanism will now be described.

Two arms 65 and 66 having cam faces 67 on the rear ends are slidably guided in a block 68 fastened to the machine and have their front ends connected together by a block 69. These arms extend rearwardly and straddle the pulley 39 and when they are moved rearwardly the cam surfaces 67 are adapted to engage extensions 70 on the pawls 45 and 47 and lift these pawls out of engagement with the teeth of the ratchet wheels 43 and 43$^a$ as is shown in Figs. 7 and 9. This will then allow the weight 35 to return the work holder 28 to its original position. The arms 66 and 65 are moved rearwardly by a screw 71 carried by the work holder 28 coming into engagement with the block 69 on the last rearward movement of the work holder 28. The block 69 is engageable with a tappet 72 adjustably fastened on a rod 73 which is slidably mounted in brackets 74 fastened to the base 2. Adjustably fastened on the rod 73 near the opposite end thereof is a tappet 75 similar to the tappet 72. As the work holder is moved rearwardly after the last operation of the vertical press the bolt 71 engages the block 69 and moves the arms 65 and 66 rearwardly thus releasing the dogs 45 and 47, as stated before. The block 69 being in engagement with the tappet 72 will also move the rod 73 and tappet 75 rearwardly. Upon the return of the work holder 28 due to the weight 35 after the dogs 45 and 47 have been released the opposite end of the bolt 71 will engage the tappet 75 on the rod 73 which will cause the rod 73 to be moved in the opposite direction. This will, of course, move the tappet 72 in the opposite direction which in turn will draw the arms 65 and 66 out of engagement with the pawls 45 and 47 and allow said pawls to re-engage the teeth of the ratchet wheels 43 and 43$^a$. The device is then ready for the next piece of work.

The work holder 28 consists of a body 76 having holes 77 drilled therethrough through which the guide rods 18 and 29 pass. A lug 78 projects from the bottom thereof and is tapped to receive the bolt 71. A block 79 having ears 80 thereon is fastened to the body 76 by means of bolts 81. The cross head 52 has the die holder 52$^a$ fastened thereto and projecting downwardly from the end of the die holder 52$^a$ is a pointed bar 83 which is adapted to pass between the ears 80 in advance of the die and thus center the work holder 28 and hold it rigidly when the punch 82 clamps the work between said punch 82 and a complementary punch plate 84 which is fastened to the bed of the press, and when the die 82$^a$ clamps the work between said die and a complementary die 84$^a$ fastened to the bed of the press. The upper end of the block 76 has extensions 85 and 86 in which are mounted the work clamping members 87 and 88, the member 87 being fastened rigidly and the member 88 being slidably mounted. The member 87 has a central pin 89 which is inserted in one end of the eye 90 of the stock 91 and the member 87 is cut out as indicated at 92 so that the stock 91 can extend outwardly therefrom. The part 88 has a corresponding pin 93 for engaging the other end of the eye 90 and has a cut-out portion similar to the portion 92 for the same purpose. This part 88 is slidably keyed in the extension 86 as indicated by the keyways 94 and 95 in the part 88. The part 88 has an extension 96 fastened thereto by a pin passing through the reduced part 97 which is inserted into a bore 98. The part 96 also has an enlarged head 99 and a spring 100 is interposed between said head 99 and the extension 86. This spring normally holds the clamp member 88 in open position. A cam member 101 from which the handle lever 60 extends is pivoted at 102 to an arm 103 which extends forwardly from the body 76. When the cam is in the position shown in full lines in Fig. 18, the parts are in position to securely clamp the work therein and when it is in the position shown in dotted lines, the parts are in such a position that the work will be released. The handle 60 is thrown into this position by coming into engagement with the arm 61, as above described.

As the bulldozer cross head returns, the clutch is automatically thrown out when it is at the rear limit of its movement by means to be described hereinafter. However, the inertia of the parts tends to throw the crank past dead center and start the cross head on a forward movement. In order to prevent this, it has been found necessary to put in a brake which will act as soon as the device starts back, due to the inertia, and thus stop it. This brake generally designated at 14 is constructed similarly to the ordinary band brake and works on a drum 110 fastened to the shaft 10.

An arm 111 terminating in a hook 112 is pivoted at 113 to a bracket 114 fastened to the cross head 4. A bracket 115, which is here shown as an angle iron with a projection 116 inclined downwardly at the end closest to the hook 112, is connected to the arm 111 and the arm 111 is normally held up in dotted line position shown in Fig. 14 by a spring 117 having one end fastened to the arm 111 and the other end fastened to the bracket 114. On the return of the cross head 4 the hook 112 will slide under the horizontal part 118 of an arm 119 which is connected to the operating arm 120 of the brake and if the cross head 4 starts in the forward direction, the hook 112 engaging the arm 119, immediately applies the brake and stops the movement. When the clutch is thrown in to start the operation, the hook 112 is first disengaged from the arm 119 by a pressure exerted upon the bracket 115 through the arm 146 as is more fully described hereinafter.

Extending outwardly from the bearing supports 11 are brackets 121 the outer ends of said brackets being connected by a flat cross bar 122. An angle iron 123 is spaced above the bar 122 by spacers 124 and the clutch operating arm slides between the bar 122 and angle iron 123. The clutch operating arm 125 (see Fig. 3ª) is pivoted at 126 and on its forward end a flat bar 127 is pivoted thereto at 128 and has its forward end inclined up as at 129. The other end of the part 127 has a cam 130 fastened thereto. The cross head 4 has a bracket 131 extending upwardly therefrom and has a trip or bell crank lever 132 pivoted in the upper end thereof. This bell crank 132 is normally held in the position shown in Fig. 1 by a spring 133. A bracket 134 is fastened to the clutch operating arm 125 and has one end of a link 135 pivoted thereto. The other end of the link 135 is pivoted to an arm 136 which is rigidly connected to a tubular shaft 137 extending across the front of the machine and rotatably mounted in brackets 138 on the front of the press. The other end of the tubular shaft 137 has an operating handle 139 rigidly connected thereto. A shaft 140 is rotatably mounted within the shaft 137 and has a short arm 141 connected to one end thereof and an operating arm 142 connected to the other end thereof. The arm 141 has a pin 143 thereon which engages under an arm 144 which is pivoted to the angle iron 123 at 145 and is turned downwardly at 146 and is adapted to engage the bracket 115 attached to the hook arm 111. The arm 142 on the opposite end of the shaft 140 is connected to one end of the link 147, the other end of the link being connected at 148 to the bell crank 149 which is pivoted at 150 to the lower end of the operating arm 139. When the operating handle 139 and the bell crank 149 are grasped and brought together the shaft 140 is rotated through the link 147 and arm 142 which in turn will move the outer end of the arm 141 upwardly, engaging the arm 144, forcing the lower end 146 down into engagement with the bracket 115 which in turn will force the hook arm 111 downwardly, forcing the hook 112 out of engagement with the brake operating arm 119. The arm 139 is then swung inwardly (or away from the operator) which rotates the hollow shaft 137 which in turn moves the clutch operating arm 135 throwing the clutch into engagement through the arm 136 and link 135. This will put the bulldozer in operation and as the cross head 4 moves forwardly the bell crank 132 will be tipped when it engages the cam 130 (Fig. 2) and returned to its normal position, as shown in Fig. 1, by the spring 133. On the return movement of the cross head 4 the bell crank 132 will engage the cam 130 and throw the clutch out of engagement by forcing the clutch operating arm 125 rearwardly, a spring 125ª completing movement of arm 125 (Fig. 3ª). The inclined portion 116 of the bracket 115 is adapted to cause the hook 111 to be gradually raised or lowered in the event that the arm 146 is left in a lowered position as the cross head moves forward and backward, in order to prevent injury to the arm 146. In case it is desired to operate the bulldozer a small amount for adjustment, etc. the inclined end 129 of the arm 127 is grasped and brought into contact with the clutch operating arm 125. This will throw the cam 130 upwardly to a point where it will be above and not be engaged by the bell crank 132.

The vertical press 3 resembles what is known as a punch press, and has a clutch 160 of that type which allows the crank shaft 161 to make one complete revolution and then stop, the shaft being driven by motor M, belt 200, shaft 201, pinion 202 and gear 203, in a known manner. This clutch 160 is operated through a link 162 by an arm 163 which is pivoted to the frame of the press at 164. A cam plate 165 is fastened near the forward end of the arm 163 and its lower edge 166 is described by an arc swung about the center of the shaft 140. A stud 167 is fastened to the bulldozer clutch operating arm 139 and is adapted to ride on the edge 166 of the cam 165 as will be readily seen. When the arm 139 is swung inwardly from the position shown in Figs. 15 and 16, it will be impossible to move the arm 163 downwardly and thus operate the clutch 160.

The edge 168 of the cam 165 is described by an arc swung about the pivot point 164 of the arm 163. This edge 168 will ride against the stud 167 on the bulldozer clutch operating arm when the arm 163 is pulled downwardly to operate the vertical press, and prevent the movement of the arm 139, thus preventing the operating of the bulldozer when the press is in operation.

The general operation is as follows: the stock is placed in the machine in the form shown in Fig. 24 and is clamped in the work holder 28 by operating the arm 60, cam 101, etc., between the members 87 and 88, the pins 89 and 93 being inserted in the eye 90 and the parts 87 and 88 gripping the outer part of the stock around the eye 90 and the flat part 91 extending through the cut-out portion 92 as shown in Fig. 21, the work holder and other parts being in the position shown in Figs. 1, 2, 3, 3ª and 4. The handle 139 and bell crank 149 are then grasped and brought to the position shown in Fig. 16 which releases the bulldozer brake and the handle 139 is shoved forwardly, away from the operator, which throws in the clutch 13, starting the bulldozer. The die 25 moves forwardly catching the work between said die 25 and the die 27 and bending the same to the shape shown in Figs. 25 and 26. On the return movement of the cross head the bell crank 132 engages the cam 130 throwing the clutch out of engagement with the assistance of the spring 125ª, the brake 14 preventing the inertia of the parts starting the cross head and connected parts on the next forward movement. The return movement of the die carrier 20 operates the mechanism, as previously described, for moving the work holder and the work carried therein into position for the first operation of the vertical press. The press is then operated by throwing in its clutch 160 by means of the lever 163, and punches the stock to produce the holes shown in Fig. 26 and upon the return movement of the press plunger the stock is moved forward into position for the next operation of the press which bends the stock to the shape shown in Figs. 27 and 28. The arm 61 being so adjusted that the lever 60 will be engaged by it as the work holder is moved rearwardly, the stock will be released and the work holder allowed to return to its starting position as hereinbefore described.

The machine is capable of many modifications within the scope of the invention. The punches or vertically operated dies herein shown may be omitted or replaced by other metal working devices capable of being used in a vertical press, the arm 61 and the tappets 72 and 75 and the associated trip mechanism which controls the feed of the work holder being adjusted to advance the work the desired number of times and to release it at the end of the last operation.

Having thus described my invention, what I claim is:—

1. In a multiple bending machine, the combination of a bed having a fixed bottom die and a fixed end die, a horizontally reciprocating bender having a die cooperating with the fixed end die, a vertically reciprocating bender having a die cooperating with the bottom die, a work holder for supporting work over the bed between both sets of dies, and means to operate the said benders successively, whereby one bender will first act on the work and then the other.

2. The combination with a press having an operating member moving in one direction, of a reciprocating bender movable in another direction, a work holder cooperating with both the press and the bender and adapted to advance the work from one operation to the next, and means to selectively operate the press and the bender.

3. The combination stated in claim 2, the press including a bed across which the bender also operates and upon which the work is supported by the holder for the operation thereon of either the press or the bender.

4. The combination of a bed, a horizontally reciprocating bender movable over said bed, a vertically reciprocating bender movable from and toward said bed and adapted to advance the work from one operation to the next, a work holder for holding work upon the bed, and means to selectively operate the horizontal and vertical benders.

5. The combination of a bed, a horizontally reciprocating bender movable over said bed, a vertically reciprocating bender movable from and toward said bed, a work holder for holding work upon the bed, and means to selectively operate the horizontal and vertical benders, the vertical bender having multiple work engaging members and being capable of successive operations for different actions upon the work, and means to shift the work holder to different positions along the bed to accommodate the successive operations.

6. The combination of a bed, a horizontally reciprocating bender movable over said bed, a vertically reciprocating bender movable from and toward said bed, a work holder for holding work upon the bed, means to selectively operate the horizontal and vertical benders, and means to prevent the operation of one bender while the other is operating.

7. The combination of a single bed, benders operating at different angles with respect to said bed, to give different bends to the work, means to operate the benders successively and selectively, and means actuated when one bender is operated to prevent the operation of the other.

8. The combination of a single bed, a vertically movable press member cooperating therewith, a horizontally movable bender member cooperating therewith, means to operate said members successively and selectively, and means to prevent the operation of the bender member when the press member is operating.

9. The combination stated in claim 8, said means including a manually operated device controlling the operation of each of the press and the bender members.

10. The combination with a press having a bed and a plunger movable up and down with respect thereto, of a reciprocating bender movable between the bed and the plunger when the latter is lifted, a work holder adapted to hold work upon the bed for operation thereon by either the plunger or the bender, the work holder being shiftable to different positions above the bed to cooperate with either the plunger or the bender in different positions respectively, and means for operating the bender when the plunger is lifted.

11. The combination with a press having a bed and a plunger movable toward and from the same, of a reciprocating bender movable between the plunger and bed when the former if lifted, a guide supported by the bed, a work holder slidable on the guide and adapted to hold work upon the bed, means to operate the bender, and means to automatically shift the work holder along the guide, controlled by the movements of the plunger.

12. The combination with a press having a bed and a plunger movable up and down with respect thereto, of a reciprocating bender movable between the bed and the plunger when the latter is lifted, a work holder adapted to hold work upon the bed for operation thereon by either the plunger or the bender, means to operate the bender when the plunger is lifted, means to operate the plunger including a clutch, and control means for the clutch consisting of a lever which can be advanced only when the bender is not in operation.

13. The combination with a press having a bed and a plunger movable toward and from the same, of a fixed die at one end of the bed, a movable die adapted to enter between the plunger and bed when the former is lifted and to then cooperate with the fixed die, and means to operate the movable die, and means to hold work above the bed in position to be acted on by either the plunger or the dies.

14. The combination of a press having a bed and a plunger movable toward and from the same, of a fixed die at the end of the bed, a movable die adapted to enter between the plunger and bed when the former is lifted and then cooperate with the fixed die, means to operate the movable die, and means to hold work above the bed in position to be acted on by either the plunger or the dies, said means being movable to hold the work holder in different positions under the plunger.

15. The combination with a single bed and a work holder associated therewith, of a press adapted to operate on the work in the holder, a clutch controlling the operation of the press, a movable bender also arranged to operate on the work in the holder, a clutch controlling the movement of the bender, a manual controlling device for each clutch, and means carried by one of said devices for preventing the operation of the other device, whereby when one clutch is engaged the other cannot be.

16. The combination stated in claim 15, the controlling means for the bender clutch including a lever having a projecting pin, and the controlling means for the press clutch including a lever having a cam plate which engages the pin and prevents the operation of the last-mentioned lever when the first-mentioned lever is moved to position to engage the clutch.

17. The combination with a reciprocating bender, and a driving gear for the same including a rotary part, of a brake member carried by said part, another brake member cooperating therewith, and means automatically actuated by the return movement of the reciprocating bender to engage the last-mentioned brake member with the first-mentioned brake member, said means including a catch engageable with the last-mentioned brake member when the bender reaches the limit of its return movement.

18. The combination of a bed having a fixed die, a reciprocating bender having a die, a work holder slidable beside the bed and mechanism operated by the bender for sliding the work over, such mechanism including a pawl and ratchet device, means to automatically disengage the pawl and ratchet at the limit of the advance movement of the work holder.

19. The combination of a bed having a fixed die, a reciprocating bender having a die, a work holder slidable beside the bed and mechanism operated by the bender for sliding the work over, such mechanism including a pawl and ratchet device, means to automatically disengage the pawl and ratchet at the limit of the advance movement of the work holder, and means for automatically re-engaging the pawl and ratchet as the work holder reaches its initial position.

20. The combination with a bed and a movable operating device cooperating therewith, of a work holder beside the bed and adapted to engage a piece of work having an eye, said work holder comprising a pin having an annular recess to receive said eye and means to advance and automatically retract said pin into contact with the eye, to engage and release the work.

21. The combination with a bed and a movable operating device cooperating therewith, of a work holder beside the bed and adapted to engage a piece of work having an eye, said work holder comprising a pin and means to advance and automatically retract said pin into and out of the eye to engage and release the work, said means including a cam operating against the pin and having a projecting arm located in the path of a stationary member and adapted to be struck and operated thereby.

22. A work holder for a piece of work having an eye at its end, comprising a curved wall into which the eye may be set, a pin at the axis of said wall adapted to be slid into and out of said eye, a spring tending to retract said pin, and a cam lever bearing against the pin and adapted to be swung to advance the same against the pressure of said spring.

23. The combination with a bed and a movable member adapted to cooperate with said bed, of a guide beside the bed, and a work holder slidable along said guide and arranged to transport a piece of work to different positions with respect to said bed, whereby successive operations may be performed on said work by said movable member.

24. The combination stated in claim 23, and means automatically actuated by the movement of said movable member to shift said work holder to different positions after each operation.

25. The combination with a bed and a movable member adapted to cooperate with said bed, of a guide beside the bed, a work holder slidable along said guide and arranged to hold a piece of work in different positions with respect to said bed, whereby successive operations may be performed on said work by said movable member, and means automatically actuated by the movement of said member to shift said work holder to different positions, said means including a pawl and ratchet mechanism connected to the work holder.

26. The combination with a press having a plunger and multiple metal working devices carried thereby, of a bed with which the plunger cooperates, a work holder shiftable beside said bed and adapted to hold a piece of work in different positions upon the bed for successive operations by said devices, and means actuated by the plunger to automatically and successively shift the work holder from one position to the next.

27. The combination stated in claim 26, said means including a shaft and a pawl and ratchet mechanism operated therewith and connected to the work holder.

28. The combination stated in claim 26, said means including a shaft, a pawl and ratchet mechanism operated with the shaft and connected to the work holder to shift the latter in one direction, means to release the pawl at the limit of such movement, and means to return the work holder to original position when the pawl is released from the ratchet.

29. The combination with a bed, a work holder beside the same, and a movable member cooperating with the bed for operation upon work having an eye held by the holder, of manually operated means for gripping the work at the beginning of such operation and automatically operated means for releasing the same at the completion thereof, said means including a sliding pin engageable with an eye in the work.

30. The combination with a bed having guides at opposite sides thereof and a fixed die at one end thereof, of a cross head slidable upon said guides and carrying a movable die, and a work holder slidable along one side of the bed and adapted to support work above said bed and between said dies, and means to operate said work holder including a pawl and ratchet mechanism actuated by the movement of said cross head.

31. The combination with a bed having guides at opposite sides therof and a fixed die at one end thereof, of a cross head slidable upon said guides and carrying a movable die, a work holder slidable along one side of the bed and adapted to support work above said bed and between said dies, and means associated with the work holder to grip the work in one position of the work holder and automatically release the same in another position.

32. A combined machine for bending a piece of work in more than one direction, comprising, in combination, a single bed having an end die and a bottom die, a horizontally slidable bender movable over the bed and having a die cooperating with the said end die to bend the work horizontally, a vertically movable bender having a die cooperating with the bottom die to bend the work vertically, and means to selectively and successively operate said benders.

33. The combination stated in claim 32, said means including a safety device preventing the operation of one bender while the other is operating.

34. In a combined machine for performing successive operations on a piece of work, the combination of a single bed, a reciprocating bender moving horizontally across the bed, a vertically movable plunger operating toward and from the bed and having multiple work engaging devices, a work holder slidable beside the bed and adapted to hold a piece of work over the bed for operation thereon by either the horizontal bender or the members carried by the vertical plunger, means to selectively and successively operate said bender and plunger including repeated strokes by the plunger after each operation by the bender, and means to automatically shift the work holder to different positions along the bed for such repeated strokes.

35. The combination of a bed, a reciprocating bender movable toward and from the same, a work holder shiftable along the bed for successive operations of the bender, means to shift the work holder along the bed, including a pawl and ratchet mechanism automatically actuated by the reciprocation of the bender, adjustable means carried by the work holder to throw out the pawl at the limit of movement in one direction, and means to return the work holder to original position.

36. The combination stated in claim 35, the work holder having an openable part to release the work, and means automatically actuated by the movement of the work holder to open said part and release the work at the limit of forward movement of the work holder.

37. The combination with a bender having a reciprocating cross head, of driving mechanism for the cross head including a rotary part and a clutch, a brake cooperating with said rotary part, means carried by said cross head for automatically releasing said clutch and operating said brake after each operation.

38. The combination with a bender having a reciprocating cross head, of a driving gear for the cross head including a rotary part and a clutch, a brake cooperating with said rotary part, a controlling lever operatively connected to the brake to release the same and to the clutch to engage the same, whereby the cross head may advance, and means automatically actuated by the cross head at the limit of its return movement to throw out the clutch and apply the brake, the last mentioned means including a lever operatively connected to the clutch, a cam attached to said lever, and a trip lever carried by the cross head and engageable with the cam on the return movement of the cross head to shift the first mentioned lever and throw out the clutch.

39. The combination of a vertically operating press member, a horizontally operating press member, a movable work holder, and means for progressing the work holder from one operation to the next, such means including two ratchets fixed to means for imparting longitudinal motion to said work holder, a pawl co-acting with one ratchet and adapted to be advanced by the movement of one press member and a second pawl coacting with the other ratchet and adapted to be advanced by the movement of the other press member.

40. The combination of a vertically operating press member, a horizontally operating press member, a movable work holder, and means for progressing the work holder from one operation to the next, such means including two ratchets fixed to means for imparting longitudinal motion to said work holder, a pawl co-acting with one ratchet and adapted to be advanced by the movement of one press member and a second pawl coacting with the other ratchet and adapted to be advanced by the movement of the other press member, each of said pawls acting independently of the other.

41. The combination of a vertically operating press member, a horizontally operating press member, a movable work holder, and means for progressing the work holder from one operation to the next, such means including two ratchets fixed to means for imparting longitudinal motion to said work holder, a pawl co-acting with one ratchet and adapted to be advanced by the movement of one press member and a second pawl co-acting with the other ratchet and adapted to be advanced by the movement of the other press member, with means for automatically releasing the pawls at the limit of forward movement of the work holder and means for returning the work holder to its original position.

42. A work holder for a piece of work having an eye at its end, comprising a pair of spaced curved walls adapted to receive and clamp the ends of the eye and having parts cut out for the portion of the work adjacent the eye, one of said curved walls being mounted on a slidable pin, and means to actuate the pin including a cam in contact with the end thereof.

43. The combination with a bender having a reciprocating cross head, of driving mechanism for the cross head including a rotary part and a clutch, a brake cooperating with said rotary part, means carried by said cross head for automatically releasing said clutch and operating said brake after each operation, said brake operating means including a trip lever carried by said cross head and adapted to engage a lever operatively connected to the brake.

44. The combination with a bender having a reciprocating cross head, of driving mechanism for the cross head including a rotary part, a brake cooperating with said rotary part, means for operating said brake comprising a trip lever carried by said cross head and adapted to engage a lever operatively connected to said brake.

45. The combination of a reciprocating member carrying dies, and fixed dies with which said dies cooperate, of a work holder movably mounted relative to said dies and adapted to progress the work from one set of dies to the next, and means carried by said reciprocating member for accurately positioning said holder relative to a set of dies.

46. The combination of a reciprocating member carrying dies, and fixed dies with which said dies cooperate, of a work holder movably mounted relative to said dies and adapted to progress the work from one set of dies to the next, and means carrried by said reciprocating member for accurately positioning said holder relative to a set of dies, said means including a guide rod fixed to said reciprocating member and a slide attached to said work holder and adapted to cooperate with said guide rod.

47. The combination with a plurality of moving members adapted to operate separately, of a work holder adapted to move work from one position to the next, a tension device operating on said work holder to return it to its original position, and means connected with each such moving member to advance said work holder when it operates and to prevent retreat of said work holder when it is not operated, said means including ratchets fixed to means for imparting lineal movement to said feed holder, and a separate pawl operated by each said member and cooperating with one of said ratchets to advance the same upon movement of the member.

48. The combination with a plurality of moving members adapted to operate separately, of a work holder adapted to move work from one position to the next, a tension device operating on said work holder to return it to its original position, and means connected with each such moving member to advance said work holder when it operates and to prevent retreat of said work holder when it is not operated, said means including ratchet wheels fixed to a shaft which, upon rotation, transmits lineal movement to said work holder, pawls pivotally mounted on a lever rotatably supported on said shaft and adapted to rotate said shaft by coaction with said ratchet wheels, and separate means connected with each lever to reciprocate said lever by the movement of one of said members.

49. The combination with a bending machine adapted to perform a plurality of separate operations, of a work holder movably mounted to progress work from one operation to the next, a tension device adapted to return the work holder to its original position, ratchet and pawl means operated by the movement of the operating members of said bender for advancing and holding said work holder against the pull of said tension device, means operated by said work holder to release said pawl at the forward end of its stroke, and means operated by said work holder for withdrawing said pawl release means upon the return of the work holder to its original position.

50. The combination with a machine having a plurality of separately and selectively operated members cooperating with a single bed, of separate pivotally mounted control levers to control each operation, each control lever being positioned, when the corresponding member is being operated, to prevent such movement of the remaining levers as would operate the members controlled thereby.

51. The combination with a machine having a plurality of separately and selectively operated members cooperating with a single bed, of separate pivotally mounted control levers to control each operation, of cam surfaces following radii described about the axes of rotation of the levers, and cooperating projections, adapted to move along said cam surfaces upon the movement of one lever, to prevent movement of the remaining levers.

52. The combination with a machine having a plurality of separately and selectively operated members cooperating with a single bed, of separate pivotally mounted control levers to control each operation, of a cam plate attached to one of said levers and having intersecting cam surfaces, one of which describes an arc about the axis of rotation of the lever to which the plate is attached and the other of which describes an arc about the axis of rotation of the other lever when the lever to which the plate is attached is in the "off" position, and a projection on the other lever positioned to follow and bear on one of the cam surfaces as either of the levers is moved to start operation of the mechanism.

In testimony whereof, I hereunto affix my signature.

OWEN DOUTT.